United States Patent [19]

Wells

[11] 3,933,392
[45] Jan. 20, 1976

[54] WHEEL RIM
[75] Inventor: William Neil Wells, Melksham, England
[73] Assignee: Avon Rubber Company Limited, Melksham, United Kingdom
[22] Filed: Feb. 18, 1975
[21] Appl. No.: 550,281

Related U.S. Application Data
[63] Continuation of Ser. No. 356,303, May 2, 1973.

[30] Foreign Application Priority Data
May 2, 1972   United Kingdom............... 20397/72
Nov. 6, 1972  United Kingdom............... 51069/72

[52] U.S. Cl. ..................... 301/98; 301/97; 152/366
[51] Int. Cl.² ......................................... B60B 21/00
[58] Field of Search .......... 152/378, 379, 366, 381, 152/396, 401, 405, 399; 301/8, 9 R, 95, 97, 98

[56] References Cited
UNITED STATES PATENTS

| 486,556 | 11/1892 | Burwell | 152/399 |
|---|---|---|---|
| 543,315 | 7/1895 | Phelps | 152/399 |
| 1,652,146 | 12/1927 | Michelin | 152/381 |
| 1,820,857 | 8/1931 | Wilson | 301/97 |
| 1,836,676 | 12/1931 | Main | 152/405 |
| 2,048,635 | 7/1936 | Kraft | 152/381 R |
| 2,148,995 | 2/1939 | Nelson | 301/97 |
| 2,840,133 | 6/1958 | Billingsley | 152/396 |
| 3,746,399 | 7/1973 | Verdier | 301/65 |
| 3,758,161 | 9/1973 | Bradley | 152/378 R |

FOREIGN PATENTS OR APPLICATIONS

| 304,297 | 3/1930 | United Kingdom | 301/8 |
|---|---|---|---|
| 690,131 | 9/1930 | France | 152/381 |

Primary Examiner—M. Henson Wood, Jr.
Assistant Examiner—D. W. Keen
Attorney, Agent, or Firm—Kenyon & Kenyon Reilly Carr & Chapin

[57] ABSTRACT

A safety wheel rim for use with pneumatic tires has a removable band which is securable so as to obstruct the mouth of the well used to receive the beads of a tire when fitting the tire onto the rim. The band can thus be locked against radial expansion regardless of the position of the tire beads so that the beads cannot accidentally enter the well in the event of deflation of the tire while travelling. The well may be offset from the median plane of the rim and also spaced from the bead-retaining flanges. Examples of the securing means for the band shown are an inflation valve stem which is screw-threaded through the outer of overlapping ends of the band and which cannot be inflated unless the band is secured, and screws arranged to tighten the band circumferentially.

16 Claims, 14 Drawing Figures

Fig.11.

WHEEL RIM

This is a continuation, of application Ser. No. 356,303, filed May 2, 1973.

FIELD OF THE INVENTION

This invention relates to wheels for use with pneumatic tires, and is concerned with the safety aspects of the design of the rims of such wheels and of their combination with pneumatic (usually tubeless) tires.

BACKGROUND OF THE INVENTION

A pneumatic tire has two inextensible beads which are retained on a wheel rim by radially projecting bead flanges at each side of the rim and rest on the base of the rim between the flanges. A single piece rim is commonly used, because it can be mass-produced cheaply and for tubeless tires only requires to be sealed at the valve hole. In order to make it possible for the beads to pass over the bead flanges, a well is provided in the base of the rim, into which one side of both beads can be sunk so that their opposite sides are raised high enough to pass over the bead flange. After the tire is fitted, the well performs no useful function until it is necessary to remove the tire. This done by a reverse operation, the beads being dislodged into the well.

In normal service the well of the rim presents no problem, but if a tire failure such as a blowout occurs, it presents a real hazard particularly at the high speeds commonplace today which nowadays is considered to be an unacceptable risk. After a blowout, and loss of pressure, one, or both tire beads frequently become dislodged by the forces acting on the wheel and tire and find their way into the well. Once this happens, the tire bead is able, under the stresses present, to pass over the rim flange, and set up steering reactions that cannot be controlled by the driver.

If the tire beads could be prevented from going into the well after a blowout, the deflated tire will remain on the rim, and improved vehicle control is possible.

There are multi-part types of rim that take apart for tire servicing, adn therefore do not require a well, but these are costly, and difficult to seal for tubeless application. The most common type also have the disadvantage that they utilise the air pressure within the tire to maintain an integral assembly. When this pressure is lost, as in a blowout, the rim frequently falls apart, and sheds its tire.

There has recently been made public, in U.K. P.S. 1160412, a proposal for a deformable one piece rim. The diameter of one of the flanges of a well-less rim is increased, or else a partial well is eliminated, by deforming the rim in a press tool after the tire has been fitted.

We are approaching it from an entirely different direction, one which in our view has many advantages. It depends on providing a well in the rim but obstructing access to the well at times when such access, in the event of tire deflation, would be dangerous.

Partial or complete obstruction of the well of a rim has been proposed before, for entirely different purposes. There are many early patents where inventors have been concerned to shift a well right to one side of the rim in order to allow as much room as possible within the radius of the rim for brake drums. Because they had done this, they had to provide something on which the bead of the tubed tire could be supported. See, for example, U.K. Pat. No. 304297 and 248305. It was also common to wrap a fabric layer or a split ring round the rim within the well of a spoked wheel to prevent the ends of the spokes from chafing the tube of a tubed tire on the rim (see U.K. Pat. No. 248305). This is still common practice with bicycle wheels today.

A modern example of the former type of proposal is seen in U.S. Pat. No. 2840133. Here the inventor was faced with the additional difficulty of how to inflate his tubeless tire when, by shifting the well right up next to a flange, he had deprived it of its usual initial seat during inflation (i.e. with the heel of the bead on the base of the rim at the flange). His invention was directed at how to inflate a tubeless tire in this situation, which he solves by having means retaining the tire bead against which the bead seals inboard of the well for initial inflation, and special air passages from a permanently bridged portion of the well into which an inlet inflation valve opens. When inflation pressure is high enough, the bead flips outwardly over the bridging strip, and seats hard against the flange of the rim. This same action wedges the frustoconical bridging strip into position. There is nothing, apart from the presence of the bead of the tire, holding the bridging strip in place. It should also be noted that the ends of the strip do not meet and are not connected together.

SUMMARY OF THE INVENTION

The invention is concerned with prevention of the catastrophic loss of steering control which frequently occurs if, when a vehicle tire deflates or explodes, one or both of the beads of the tire shift, fall into the well and then escape from the rim. It can be seen that in the arrangement of U.S. Pat. No. 2840133, for example, as soon as the bead shifts inwardly on deflation, the bridging strip is free to expand and fly off the rim under centrifugal force. Apart from the danger this itself would cause, the well is then uncovered for the bead to fall into.

Even if a bead falls into the well without escaping from the rim there is a loss of concentricity and hence of some steering control.

The present invention therefore provides a removable well obstructor in and for a wheel rim which when positioned in the rim is provided with means positively retaining it against radial displacement. The means are effective whether or not a tire is actually present, and whatever the position of the beads of such a tire.

The well obstructor thus denies the beads access to the well so that they should not escape from the rim and so that they also remain generally concentric with the axis of rotation of the wheel. Consequently when a blowout occurs there is a greatly reduced chance of the tire being lost with loss of control, and the beads remaining concentric retain as much as possible of steering control and tend to cause the vehicle to continue to run on the rubber material of the tire, the latter especially if low aspect tires are used. This latter has a second effect; the presence of a sandwich of rubber between the rim flange and the road will tend to prevent the flange engaging the road directly. If the vehicle deviates from a straight path, digging in of the flanges into the road can cause the vehicle to overturn.

In any such arrangement the obstructor can only be removed by a conscious human action, i.e. the release of the retaining means. A particularly suitable obstructor from the point of view of effectiveness, cheapness and ease of retention, is a band secured around the mouth of the well and retained by a screw or screws against circumferential expansion. The person installing or removing the tire has merely to push the beads across the rim so that the screw or screws are accessible, and do them up or undo them as the case may be. Especially effective are arrangements where the screw is arranged tangentially across a circumferential gap in the band, so that it can place the band under circumferential tension. The screw is then positioned within the well.

Alternatively, and this is a further safety feature, a radially directed obstructor-retaining screw may forbid passage of a bead over the obstructor towards the flange against which it will seat unless that screw is tightly home and effective to retain the obstructor. A further alternative is that a radially directed obstructor-retaining screw is a stem for an inflation valve so that the tire cannot be inflated unless the retaining means is effective.

When the well is positioned near a flange it allows, as in the prior art, more room for a brake drum assembly; but also the depth of the well may be minimized, and its accessibility for the fitting or removing of the obstructor improved.

There is no problem in the present invention in obtaining inflation of a tubeless tire since the seat for the bead of the tire during initial inflation is on the rim base beyond one edge of the obstructor and adjacent a flange: for this reason it is preferred that the obstructor has a truly cylindrical outer peripheral surface and the rim base has frustoconical portions adjacent the flanges. It is thus preferred that the well is spaced from the flange and that the rim base axially outwardly of the well is of a diameter such as to allow at least the heel to be seated thereon during initial inflation, i.e. inflation pressure is not required to force the bead over the obstructor. The safety wheel embodying the invention, and its rim, is simple to construct and a tire can be fitted onto it without the use of special tools or apparatus. It costs little if any more than conventional wheels.

The advantages in terms of increased safety are very considerable, especially in present day road conditions, where high speeds are becoming commonplace, and roads are becoming more crowded, especially on motorways, where the consequences of a tire blowout is usually very costly in human lives and material damage.

DESCRIPTION OF THE DRAWINGS AND OF PARTICULAR EMBODIMENTS

In the accompanying drawings there are shown various particular forms of the present invention, given by way of example only. In the drawings.

Figure 1:
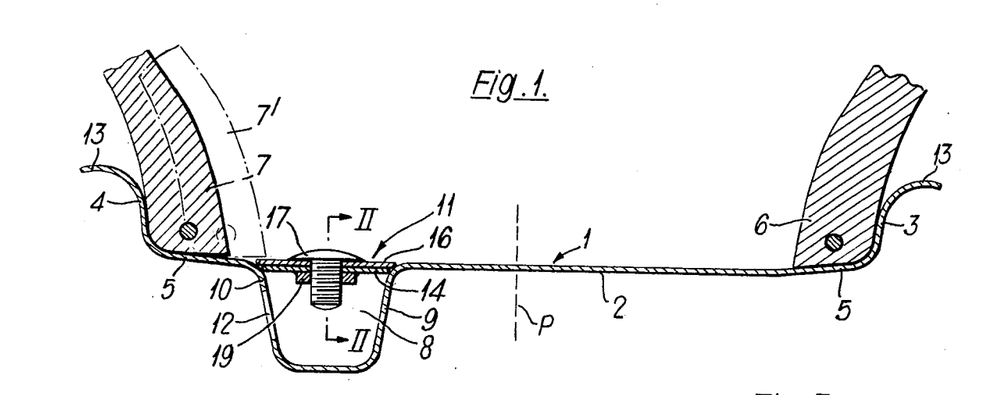
FIG. 1 is a section on a radius of a first embodiment of rim.
Figure 2:
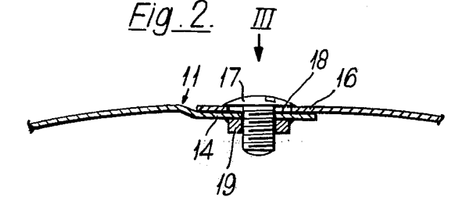
FIG. 2 is a section on the line II — II, FIG. 1.
Figure 3:
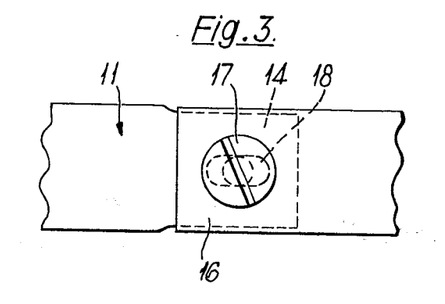
FIG. 3 is a view on the arrow III, FIG. 2.

The first embodiment of rim according to the invention is shown in FIGS. 1 to 3. It is a one-piece rolled steel rim 1 with a base 2 and two bead flanges 3,4. The base has frustoconical portions 5, having an angle of conicity of about 4° or 5°, adjacent the flanges. Tire beads 6,7 in normal use are positioned adjacent the bead flanges and are borne by the frustoconical portions 5. Close to one of the bead flanges 4 is a well 8, which is considerably axially narrower than a conventional, centrally situated well. At its mouth is its radially outermost part, its side walls 9,10 merge into the base 2, one wall 10 merging into one of the frustoconical parts 5 which lies between it and the flange 4. A removable well obstructor 11 can occupy the mouth of the well so that its outer surface is flush with the surface of the base 2. THe obstructor is a split ring of metal of the same gauge as the metal of the remainder of the rim 1.

One wall 10 has an aperture 12 for the insertion of an inflation valve. Each flange has an axially outwardly curving lip 13 at its outer radial portion.

Figure 11:
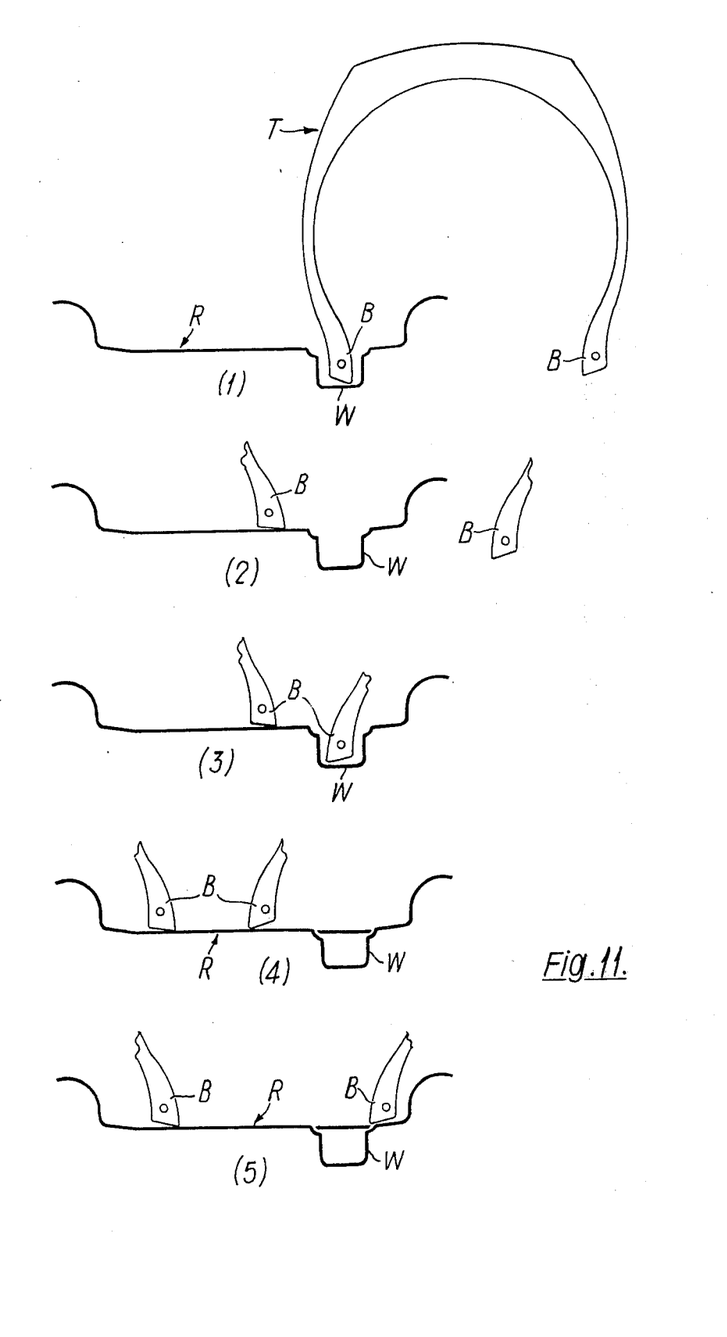
FIG. 11 shows typical stages of fitting of a tire and a well obstructor to any rim embodying the invention.

The obstructor 11 is not in position when the tire is fitted, this being done by putting one side of the beads successively into the well and then passing their other sides over the flange 4 (see also FIG. 11). Because of the position of the well closely adjacent to the flange 4 only one bead need be received in it at a time. Then both beads are removed away from the well towards the bead flange 3 and the obstructor 11 is fitted and fastened in position, by fastening means for its ends. As shown in FIGS. 2 and 3 one end 14 is joggled inwardly and is secured radially inwardly of the other end 16 by a screw 17. The stem of the screw 17 passes through a circumferentially elongate slot 18 in the end 16 and screwthreadedly engages a captive nut 19 secured to the end 14 e.g. by welding. The ring is circumferentially held tight and the screw 17 tightened up so that the ring cannot radially expand. The beads are then moved towards the respective bead flanges, one moving over the obstructor, and the tire is inflated through a valve provided in the aperture 12. The bead 7 may first seat not against the flange but against a frustoconical portion 5, as indicated at 7', but inflation will still be possible since this seating is between the edge of obstructor nearest the flange 4 and that flange. To remove the tire, air is released from it and the bead against the flange 4 is dislodged towards the flange 3, the obstructor 11 unfastened and removed to render the well accessible so that the tire can be taken off the rim by using the well.

A rolled rim will be attached to a wheel disc.

During use of the tire, should it lose its air, the beads cannot enter the well and the beads are retained concentrically on the rim. It is preferred to use a low-aspect tire (that is one of about 60% aspect ratio or less) because such a tire, with a proper choice of the dimensions of the rim and having considerable lateral rigidity in the tread and breaker portion will offer considerable controllability after air-loss, since the tire will not be able to roll over to any great extent or even be able to shift the beads away from the flanges inwardly of the rim, except under exceptional circumstances. This advantage is not available, at least to such a degree, where tires are of a higher aspect ratio, unless especially designed with a stiffened sidewall. The aspect ratio of a tire is the ratio of its radial height to its axial width.

The lips 13 provide a bearing surface for the sidewalls of a deflated tire (particularly one of low aspect ratio). A sandwich of rubber formed by the collapsed sidewall between these surfaces and the ground will also contribute to preservation of steering control and tend to avoid the digging in of flanges into the road surface, which can cause overturning of the vehicle.

It is also apparent that should the screw 17 not be tightened during fitting it will protrude radially outward and prevent or hinder the tire bead 7 from being seated adjacent the flange 4 and inflated.

Figures 4, 5:
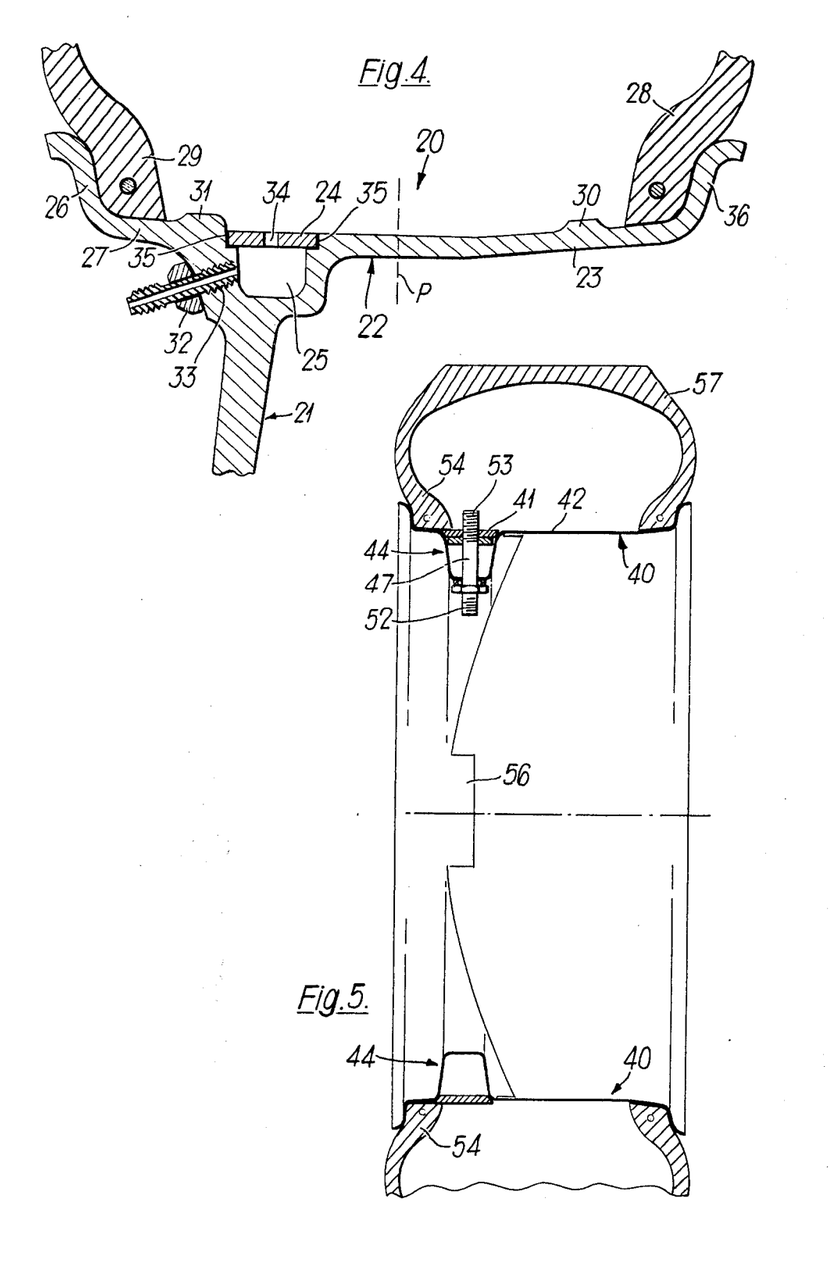
FIG. 4 is a section on a radius of a second embodiment of rim, which is integral with a wheel disc.
FIG. 5 is a diametrical section of a third embodiment, showing a non-integral wheel disc.

A second embodiment is shown in FIG. 4. Here, a rim 20 is integral with a wheel disc 21, which may be interrupted or gapped. These may be rolled, pressed, forged or cast parts, in either steel or alloy.

A base 22 of the rim has a central truly cylindrical portion with a frustoconical portion 23 merging into it on one axial side. Part of its cylindrical portion is made up by a well obstructor 24, fitted in the mouth of a well 25, the base of which is at the radially outermost part of the wheel disc 21.

The well 25 is, as in the first embodiment, between the median plane P of the rim and one of its flanges. In the present case it is nearer flange 26 than flange 36. Between the well 25 and the flange 26 there is a frustoconical portion 27 outwardly stepped from the radius of the cylindrical portion of the base 22.

The portions 23 and 27 support beads 28,29 respectively of a tubeless tire, which, at least when the tire is inflated, seat against the flanges 26,36 respectively.

Axially inwardly of the beads when thus seated are respective safety ridges or studs 30,31, formed in the surface of the base of the rim. Ridge or stud 31 lies between the edge of the obstructor 24 nearest the flange 26, and that flange. These ridges or studs are to hinder lateral movement of the beads when the tire is deflated, but do not prevent such movement (otherwise the tire could not be fitted). They are an optional feature only.

The edges of the obstructor 24 are seated in respective annular rebates 35 at the mouth of the well.

An inflation valve 32 of metal or rubber is fitted to an aperture 33 in one wall of the well, and one or more apertures 34 pierce the well obstructor 24 to allow passage of air freely from the well to within the tire, and vice versa.

Various forms of obstructor suitable for this embodiment will be described more fully in connection with FIGS. 8 to 10.

Figures 6, 7:
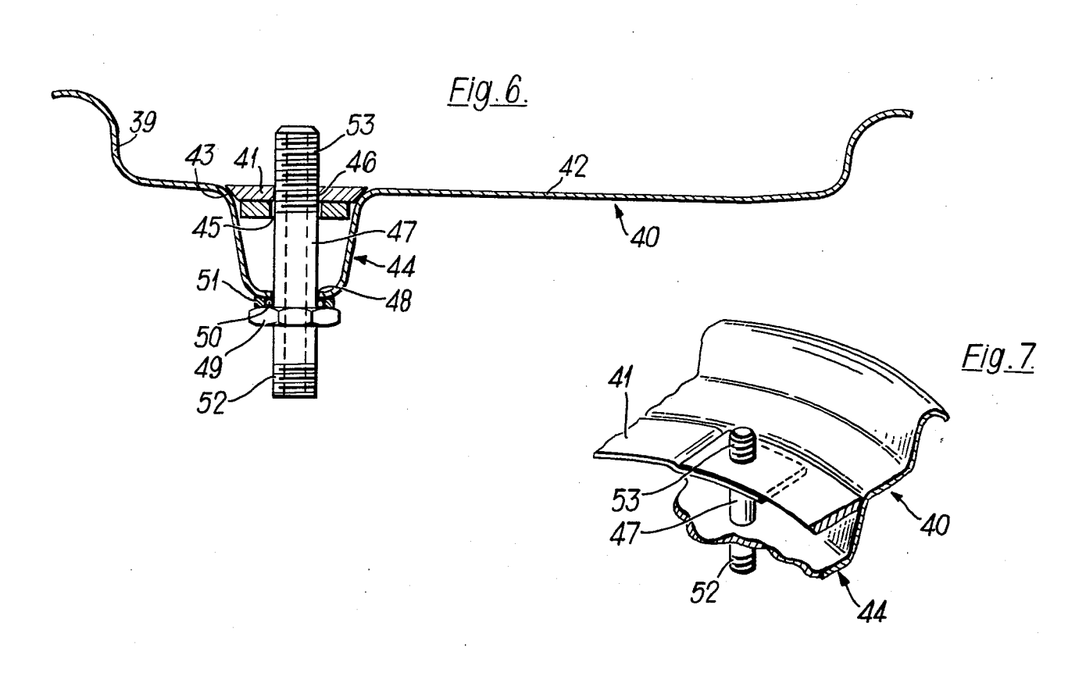
FIG. 6 is a detail from FIG. 5.
FIG. 7 is a scrap perspective view of part of the third embodiment.

In a third embodiment, shown in FIGS. 5 to 7, a removable wheel rim well obstructor for a rim 40 generally as in the first embodiment is in the form of a steel band 41 which is of a length slightly greater than the circumference of the base 42 of the wheel rim so that its ends overlap when the strip is placed in its operating position. In this operating position its radially inwardly chamfered axial edges 43 rest on the sides of the mouth of an off-centre well 44 of the rim 40. The band may be as described in the first embodiment or as will be described with reference to FIGS. 8 to 10. One end of the band has a screw-threaded aperture 46 which receives a screw-threaded element 47 in the form of a hollow stem which is the body of an inflation valve (the non-return parts of which are not shown in the drawings). The other end of the band, lying radially inside the first, has a plain aperture 45. The element 47 holds the two ends of the band 41 together so that it forms a ring and allows it to be secured firmly in place by passing the element 47 radially inwardly through an aperture 48 in the base of the well and providing on it a faceted part 49 with interposition between the nut and the outside of the base of the well of an O ring 50 and a gasket 51 to ensure the sealing of the leak path from the inside of the tire, which exists around the outside of the element 47. The radially inward end of the element 47 is screw-threaded at 52 for the reception of a nozzle of an inflation pump in conventional manner.

The radially outward end 53 of the element 47 projects, however, radially outwardly from the obstructor and acts as a safety bolt, that is to say, prevents any possibility of a tire bead indicated at 54, FIG. 5, from moving across the wheel rim upon deflation. This will increase further the degree of control available to the driver if there is a sudden deflation since, although the presence of the well obstructor will prevent any bead getting into the well and thus will prevent the tire from flying off, even the sliding motion of the beads along the rim which is possible when the tires of comparatively high aspect are used (say 70% or more) contributes to loss of control and it is desirable to prevent this. It is also noticeable that the use of the safety element to secure the well obstructor prevents rotation of the well obstructor relative to the wheel rim and, when the safety element is a valve body it ensures that the tire cannot be inflated until both the well obstructor and the safety element are securely in position.

FIG. 5 also indicates how the wheel rim 40 may be mounted on a wheel disc diagrammatically indicated at 55 and having a hub portion 56 for securing to a wheel hub, with the well off-set from the disc to an extent where the removable obstructor 41 bears some of the pressure of the tire bead 54 during normal running of the tire. The tire 57 is shown as a low aspect ratio tubeless tire.

Various forms of obstructor bands are illustrated in FIGS. 8 to 10. It should be borne in mind that bands because of their ease of manufacture, comparative cheapness and lightness are preferred to act by themselves as obstructors, the invention comprehends obstructors which fully occupy the well.

Figures 8A, 8B:
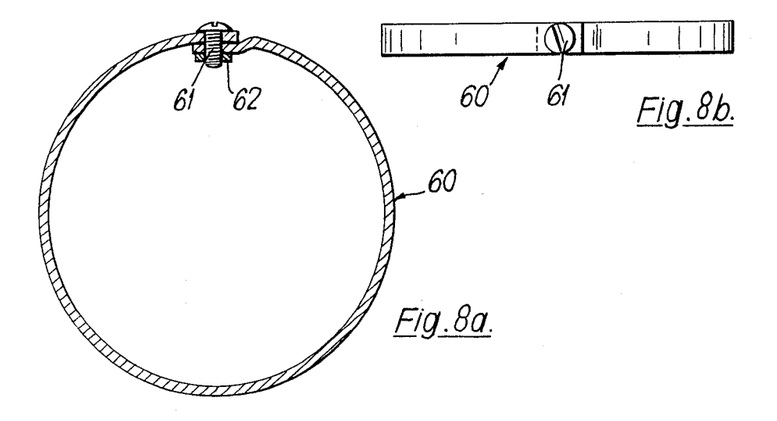
FIGS. 8, 9 and 10 show respectively further different well obstructors, the Figures *a* being elevations and the Figures *b* top views of the respective securing arrangements.

FIGS. 8a and b show a band obstructor 60 of which the ends are circumferentially overlapped and secured together by a screw 61 engaging a captive nut 62. This differs from the form of obstructor 11 described earlier only in that there is no allowance for manufacturing tolerance, in that neither aperture through which the screw passes is circumferentially elongate.

Figures 9A, 9B, 10A, 10B:
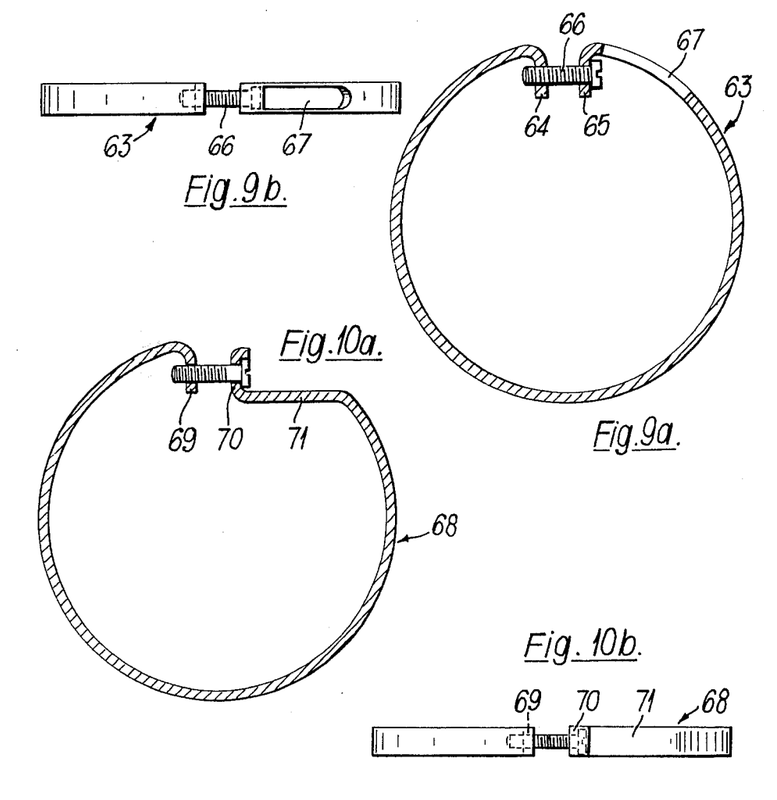

FIGS. 9a and b show a preferred form of band obstructor 63. The ends 64,65 of the band are both radially inturned to lie opposite each other. A screw 66 extends between the ends, its stem screw threadedly engaging an aperture in end 64 and passable freely through an aperture in end 65. Its head engages the end 65. An elongate slot 67 is provided in the band adjacent the end 65 to allow access of a screwdriver to the head of the screw 66. Turning the screw draws the ends 64,65 together tangentially (or allows them to move apart) so that when the obstructor band is positioned in a rim it may be placed under a desired degree of circumferential tension.

FIGS. 10a and b show another form 68 where a similar tensioning effect may be obtained, but where one band end 69 is inturned radially and one, 70, outturned radially from a chordal portion 71. In the embodiments shown in FIGS. 9 and 10 the regions where the obstructors do not fully close the mouth of the well when the obstructor is fixed are not sufficiently large to allow a bead to enter a significant distance into the well. These regions also allow the passage of air freely between the well into the tire.

In both these last two forms of band, the screw which acts to retain the band in use is housed within the rim well the mouth of which the band is obstructing.

FIG. 11 is to illustrate the stages 1 to 5 used to fit a tire T to a typical rim R embodying the invention and make it ready for inflation. Removal of a tire involves carrying out the same steps in the reverse order.

In stages 1 to 3, beads B of the tire are put one by one in the well W while at the opposite diameter of the tire the bead portion there is pushed over the rim flange at that axial side of the rim. In stage 4 both beads B are pushed to one side of the rim to render the well accessible to the mechanic, and an obstructor is fitted and its retaining means engaged.

Then in stage 5 one bead is passed over the obstructor to engage the base of the rim between the well and the nearer flange, and the tire is ready for inflation.

I claim:

1. A safety road wheel for receiving a tubeless pneumatic tire with inextensible beads having, in combination, a rim supported by a wheel structure and having a flange each axial side of the rim and a base, the base of the rim having a cylindrical portion and bead seats, each bead seat being adjacent a different one of said flanges, the bead seats being adapted to receive and seat beads of a tubeless tire to support loads transmitted between the beads and rim during use, the cylindrical portion of the rim having a well disposed axially between the bead seats and having side walls and a well base, the well being axially adjacent one of the bead seats and spaced from the other bead seat, the side walls extending radially inwardly of the cylindrical portion of the rim towards the well base, the well having a well mouth circumferentially continuous around the rim and being adapted to receive a tire bead during fitting of a tire, removable obstructor for the well, the obstructor including a band to extend circumferentially around the well at least at the mouth thereof and with ends of the band juxtaposed, and coupling means acting between the ends of the band effective for holding them positively together and retaining the band inextensibly and holding the obstructor radially towards the base of the well, the obstructor when so retained denying the tire bead access to any substantial circumferential length of the well, the said retaining means being operable at will to retain or release the said obstructor.

2. A safety road wheel as claimed in claim 1 wherein the bead seats are frusto-conical, radially outwardly flaring, portions of the base, the obstructor being spaced away from each flange by at least an axial distance equal to the axial width of a said frusto-conical portion, the radius of the cylindrical portion and the least radius of the bead seats being at least as large as the greatest radius of the obstructor.

3. A safety road wheel as claimed in claim 1 wherein the band is disposed as a circumferentially gapped circle at a radially outer part of the well and abutting against the side walls of the well at the mouth of the well, the retaining means for the obstructor including a tangentially disposed tightenable screw, the said screw acting between tangentially spaced ends of the band across the gap of the circle to exert circumferential tension on the band.

4. A wheel assembly including a wheel structure having a central hub portion and a wheel rim, the rim having a base and a radially outwardly projecting flange at each axial edge of the base, the base having a radially inset well between the flanges and nearer to one of them than to the other, a tubeless tire having bead portions each having a base and a heel, the bead portions to be laterally seated against the flanges respectively, the axial distance between the said one flange and the well being such that a bead seat is defined between them on which substantially the whole base of a bead portion of the tire seats in use and on which the heel of the base of the bead portion is disposed for initial inflation, the axial width of the well being slightly greater than the axial width of each bead portion, and a removable well obstructor, adjustable force applying means positively but releasably retaining the obstructor inextensibly in the rim with a selectable level of force between the obstructor and the rim adjacent the well to occupy at least a radially outer portion of the well around substantially the whole circumference of the rim.

5. A wheel assembly according to claim 4 wherein at least one radially outward projection extending circumferentially around the base of the rim immediately adjacent that side of the well which is nearer a flange to hinder lateral travel of the tire beads.

6. A wheel assembly as claimed in claim 5 wherein a stepped ledge is provided in each side wall of the well at the mouth of the well, and lateral edges of the obstructor engage respectively in the said ledges.

7. A wheel assembly according to claim 4 wherein the well obstructor includes a band having a truly cylindrical radially outer peripheral surface and in which the least radius of the base of the rim at each axial side of the well is at least as great as the greatest radius of the band when retained in the rim to occupy a radially outer portion of the well.

8. In a flanged wheel rim having a well having a continuous circumferential mouth in the substantially cylindrical base of the rim and between bead seat portions of the base for sealingly receiving beads of a tubeless tire, the improvement comprising a removable obstructor including a band extending without interruption adjacent the mouth of the well for substantially the whole circumference of the well and tangentially directed screw means positively holding the obstructor under circumferential tension in the well irrespective of the position of any tire on the rim by positively holding the adjacent ends of the band adjacently together whereby to form the band into an inextensible broken ring, the said means being controlledly releasable at will.

9. In a one-piece wheel rim having mounted thereon a tubeless tire, the rim having flanges, a rim base between the flanges, and a circumferentially continuous well with side walls and a well base, the beads of the tire being seated on bead seat portions respectively remote from each other across the well and adjacent the flanges, the beads having occupied the well during the mounting of the tire on the rim, and an inextensible strip spaced over the well base, the improvement for avoiding shedding of a tire bead from the rim in the event of deflation comprising screw-threaded means engageable to hold together circumferentially adjacent ends of the strip and positively prevent radial expansion of the strip, and a lateral retention means for a bead of the tire axially between one flange of the rim and the axial edge of the strip axially nearer the one flange.

10. The improvement claimed in claim 9 wherein the rim is apertureless except for a valve aperture in the circumferentially continuous well, and there is at least one aperture in the strip for passing air from the well to inside the tire.

11. A method of assembling a wheel and tubeless pneumatic tire, the wheel having, in combination, a rim supported by a wheel structure and a flange each axial side of the rim and a base, the base of the rim having a cylindrical portion and bead seats, each bead seat being adjacent a different one of said flanges, the bead seats being adapted to receive and seat beads of a tubeless tire to support loads transmitted between the beads and the rim during use, the cylindrical portion of the rim having a well disposed axially between the bead seats and having side walls and a well base, the well being axially adjacent one of the bead seats and spaced from the other bead seat, the side walls extending radially inwardly of the cylindrical portion of the rim towards the well base, the well having a well mouth and circumferentially continuous around the rim and being adapted to receive a tire bead during fitting of a tire, a removable obstructor for the well, the obstructor including a band to extend circumferentially around the well at least at the mouth thereof and with ends of the band juxtaposed, and coupling means acting between the ends of the band effective for holding them positively together and retaining the band inextensibly and holding the obstructor radially towards the base of the well, the obstructor when so retained denying the tire bead access to any substantial circumferential length of the well, the said retaining means being operable at will to retain or release the said obstructor, the method including the steps of using the well to accommodate the beads of the tire successively as they are passed over a flange of the rim onto the rim, then moving the beads axially clear of the well, placing a well obstructor at the well, securing together the ends of the band together by the retaining means to lock the obstructor against circumferential expansion, passing one bead of the tire substantially completely past the obstructor to seat it on the bead seat adjacent the well, and inflating the tire.

12. A wheel rim having at each lateral edge a radially upstanding flange and a base disposed between the flanges and offering adjacent each flange respective seat portions for seating substantially the whole of the axial width of respective beads of a tubeless tire, a radially inwardly projecting well circumferentially continuous and lying substantially wholly between the seat portions, a mouth of the well lying radially flush with adjacent portions of the base, an aperture in the well affording a sole air path through the rim from a radially inner surface thereof to a radially outer surface thereof and adapted to receive an inflation valve, an obstructor for denying the beads access to the well from the seat portions, the obstructor occupying at least the mouth of the well over substantially the whole of the circumference thereof and extending substantially flush with the said adjacent portions of the base, means in the obstructor offering an air path for air from the valve aperture to a radially outer surface of the obstructor, the obstructor comprising an inextensible element comprising coupling means for positively acting between adjacent ends of the element to clamp the obstructor over the mouth of the well and to restrain the element against circumferential expansion.

13. A wheel rim as claimed in claim 12 wherein the obstructor comprises a two-ended strap extending circumferentially around the rim in the mouth of the well and having a diameter at most equal to that of the adjacent portions of the base, and wherein the coupling means positively acting between the ends of the strap comprises screw means for holding the ends of the strap together, the screw means being engaged through apertures in the said ends.

14. A wheel rim as claimed in claim 13 wherein a screw of the said screw means extends radially of the rim and bears by means of its head on one of the said ends and a nut screwthreadedly engaged on the screw bears on the other of the said ends to urge the two ends radially together.

15. A wheel rim as claimed in claim 13 wherein the said ends are radially directed and a screw of the screw means extends tangentially of the rim and bears by means of its head on one of the said ends and screwthreadedly engage on the other of the said ends to urge the two ends tangentially together.

16. A wheel rim as claimed in claim 13 where the obstructor substantially fully occupies the well.

* * * * *